July 4, 1950     D. R. BUSS     2,513,548
FISHHOOK
Filed March 27, 1947
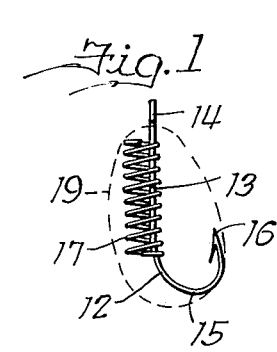
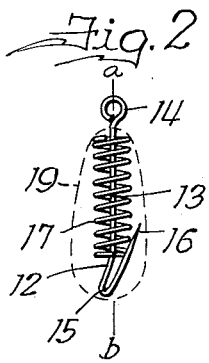
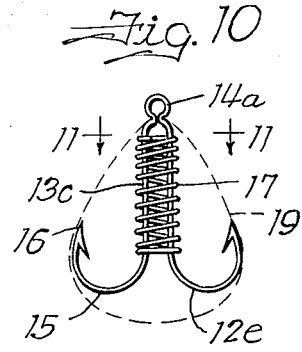
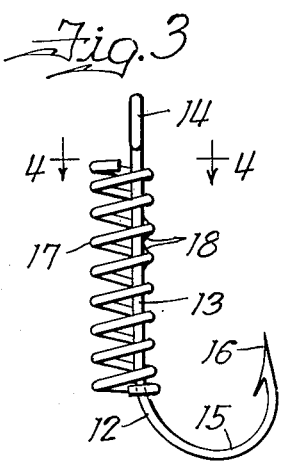
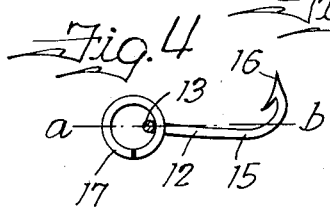
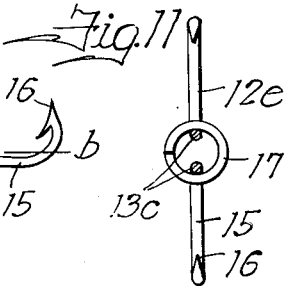
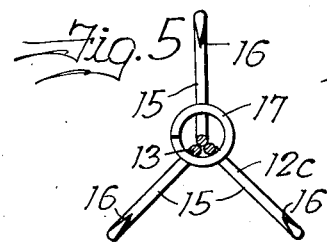
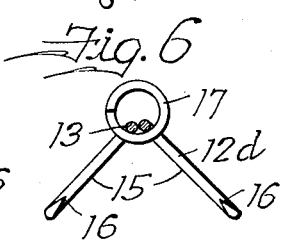
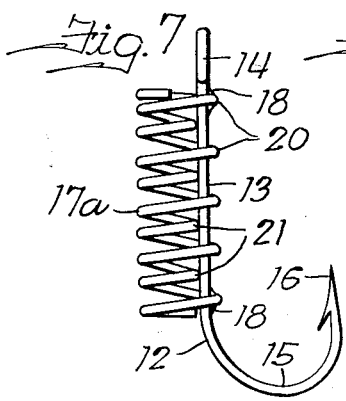
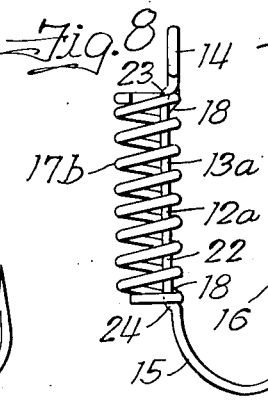
Inventor
Donald R. Buss
atty.

Patented July 4, 1950

2,513,548

UNITED STATES PATENT OFFICE 2,513,548

FISHHOOK

Donald R. Buss, Lanark, Ill.

Application March 27, 1947, Serial No. 737,507

5 Claims. (Cl. 43—44.8)

This invention relates to fish hooks.

The principal object is to provide a fish hook having an improved bait retaining basket incorporated in the construction thereof to make it feasible and practical to use a prepared dough-like or paste form of bait such as is especially recommended in fishing for cat-fish and certain other fish.

In accordance with my invention a coiled spring is suitably rigidly secured to the shank of the hook lengthwise thereof below the attaching eye and so that the coils are disposed on the far side of the shank away from the barb, leaving the barb and substantially the whole end portion of the hook exposed for action when the fish bites, without impairing the bait retaining function of the spring.

The coiled spring may be fastened to the shank by soldering or welding a few or all of the coils thereto, or by otherwise mechanically connecting the parts together, with or without the soldering or welding.

The invention is illustrated in the accompanying drawing, in which

Figs. 1 and 2 are two side views, taken at right angles to one another, of a fish hook made in accordance with my invention, showing the parts substantially actual size;

Fig. 3 is an enlargement of Fig. 1;

Fig. 4 is a cross-section on line 4—4 of Fig. 3;

Figs. 5 and 6 are sections similar to Fig. 4, but illustrating three and two-barbed hooks;

Figs. 7-9 are side views of other fish-hooks like Fig. 3, but showing three other ways of mounting the coiled spring on the shank;

Fig. 10 is a view similar to Fig. 1, but showing a two-barbed hook the two spaced shank portions of which are secured in the spring on diametrically opposite sides thereof, and Fig. 11 is an enlarged cross-section on line 11—11 of Fig. 10.

Similar reference numerals are applied to corresponding parts in the various views.

Referring first to Figs. 1-4, the reference numeral 12 designates a fish hook having a substantially straight elongated shank portion 13, on the upper end of which an attaching eye 14 is formed and on the lower end a hook portion 15 ending in a barb 16. A bait retaining basket in the form of a coiled spring 17, in accordance with my invention, is disposed lengthwise of and over the shank 13, so that the plane a—b of the hook passes through the axis of the spring, the spring being soldered or welded to the shank 13 by one or more or all of its coils as indicated by the fillets 18 in Fig. 3, so that the coils are disposed on the far side of the shank 13 away from the barb 16, leaving the barb 16 and substantially the entire hook portion 15 exposed for action when the fish bites, without impairing the bait retaining function of the spring. Bait of a prepared dough-like or paste form is applied to the hook in the form of a pear-shaped wad, as indicated in dotted lines at 19 in Figs. 1 and 2, and it fills up and adheres to the spring 17 so as to be mechanically retained in proper relation to the barb 16 which is disposed close to the surface of the wad 19 to take hold the instant the fish bites.

Figs. 5 and 6 show sections of plural pronged fish-hooks 12c and 12d in which the shanks 13 are disposed in parallel abutting relation and welded or soldered to the inner side of coils of the springs 17, the spring being on the side remote from the barbs 16 of two of the hooks in both cases.

The spring may be mounted on the fish hook 12, as shown in Fig. 7, wherein the spring 17a has alternate coils spread radially in the direction of the barb 16 enough to permit passing the shank 13 between the inside of the spread coils 20 and the outside of the intermediate coils 21, the spring 17a being otherwise disposed in the same relationship to the fish hook 12 as the spring 17 in Figs. 1-4. The spring 17a is soldered or welded to the shank 13 by one or more or all of the coils, as indicated at 18. With this construction there is less likelihood of the spring breaking loose from the shank of the hook if handled roughly. In making this fish hook, the attaching eye 14 is formed on the upper end of the shank 13 after the latter is assembled in the spring to facilitate entry of the shank between the offset coils.

The shank 13a of the fish hook 12a may be formed as shown in Fig. 8 with the portion 22 that extends through the spring 17b bent in offset parallel relation to the upper and lower ends 14 and 15 so as to define locating shoulders 23 and 24 above and below the upper and lower ends of the spring and thus make for a stronger construction, these shoulders serving to relieve the soldered or welded connections 18 of strain in event of rough handling of the fish hook, the spring being fastened in this way by one or more or all of the coils.

Fig. 9 shows still another construction in which the fish hook 12b is like the fish hook 12, but has a loop 25 bent in the shank 13b below the attaching eye 14 to receive the upper end of the spring 17c to relieve the soldered or welded connections 18 of strain in event of rough handling of the fish hook, the spring being fastened in this way by one or more or all of the coils. The upper end of the spring may be bent around the loop 25, as indicated at 26, to further strengthen the construction. Curling both ends of the spring around the shank of the fish hook, with one or both ends entered in looped portions of the shank may obviate necessity of soldering or welding.

The construction of Figs. 10 and 11 includes a one-piece, two-barbed hook 12e, the two shanks 13c of which are interconnected by an integral attaching eye 14a, the spring 17 being welded or soldered at diametrically opposite sides by one or more or all of the coils. The hook portions 15 extend away from each other as shown, so that the spring is in the same relation to the barb 16 on each hook portion as in the structure of Figs. 1–4. The bait wad 19 covers both bails 15 and the whole spring, and the barbs 16 are close to the surface of the bait so as to take hold the instant the fish bites.

It is believed the foregoing description conveys a good understanding of the objects and advantages of my invention. The appended claims have been drawn to cover all legitimate modifications and adaptations.

I claim:

1. A fish hook comprising an elongated shank having a hook-shaped end portion terminating in a barb and a line attaching eye on the other end, and a bait retainer comprising an elongated, coiled wire helix element that is large in diameter in relation to the shank and is disposed lengthwise of said shank between the eye and hook and rigidly secured to said shank against endwise movement, the helix element having the shank extending lengthwise therethrough in abutment with the inside of the coils thereof, and the helix element being disposed with portions of the coils projecting in spaced relationship from the shank on the far side away from the barb.

2. A fish hook comprising an elongated shank having a hook-shaped end portion terminating in a barb and a line attaching eye on the other end, and a bait retainer comprising an elongated, coiled wire helix element that is large in diameter in relation to the shank and is disposed lengthwise of said shank between the eye and hook and rigidly secured to said shank against endwise movement, the helix element being disposed with the shank in abutment with one side of the coils thereof and with the coils projecting from the shank on the far side away from the barb.

3. A fish hook comprising an elongated shank having a hook-shaped end portion terminating in a barb and a line attaching eye on the other end, and a bait retainer comprising an elongated coiled wire helix element that is large in diameter in relation to the shank and is disposed lengthwise of said shank between the eye and hook, said shank having an elongated portion thereof between the eye and hook bent into off-set parallel relation to the rest of the shank to define shoulders at the ends thereof for abutment with the end coils of the helix, and said helix being rigidly secured to said offset portion of said shank.

4. A fish hook comprising an elongated shank having a hook-shaped end portion terminating in a barb and a line attaching eye on the other end, and a bait retainer comprising an elongated coiled wire helix element that is large in diameter in relation to the shank and is disposed lengthwise of said shank between the eye and hook, said shank having an elongated portion thereof between the eye and hook bent into offset parallel relation to the rest of the shank to define shoulders at the ends thereof for abutment with the end coils of the helix, said helix being rigidly secured to said offset portion of said shank, and the helix being disposed with the coils projecting from the shank on the far side away from the barb.

5. A fish hook comprising an elongated shank having a hook-shaped end portion terminating in a barb and a line attaching eye on the other end, and a bait retainer comprising an elongated, coiled wire helix element that is large in diameter in relation to the shank and is disposed lengthwise of said shank between the eye and hook and rigidly secured to said shank against endwise movement, the helix element being disposed with the shank in abutment with one side of the coils thereof.

DONALD R. BUSS.

REFERENCES CITED

The following references are of record in the file of this patent:

UNITED STATES PATENTS

| Number | Name | Date |
|---|---|---|
| 70,913 | Sterling | Nov. 12, 1867 |
| 615,170 | Henckler | Nov. 29, 1898 |
| 1,851,698 | Fitch | Mar. 29, 1932 |
| 1,993,018 | Pfeifle | Mar. 5, 1935 |
| 2,102,739 | Peters | Dec. 21, 1937 |
| 2,115,493 | Kosten | Apr. 26, 1938 |
| 2,222,554 | Wirth et al. | Nov. 19, 1940 |
| 2,454,879 | Mattingly | Nov. 30, 1948 |

FOREIGN PATENTS

| Number | Country | Date |
|---|---|---|
| 369,346 | France | June 9, 1907 |
| 857,563 | France | Apr. 22, 1940 |